United States Patent
Rugina et al.

(10) Patent No.: US 9,146,758 B2
(45) Date of Patent: Sep. 29, 2015

(54) SIMULTANEOUS PROBING OF MULTIPLE SOFTWARE MODULES OF A COMPUTER SYSTEM

(75) Inventors: Radu Rugina, Sunnyvale, CA (US); Ricardo E. Gonzalez, Portola Valley, CA (US); Alok Kataria, Sunnyvale, CA (US); Doug Covelli, Cambridge, MA (US); Robert Benson, San Francisco, CA (US); Matthias Hausner, Belmont, CA (US)

(73) Assignee: VMware, Inc., Palo Alto, CA (US)

( * ) Notice: Subject to any disclaimer, the term of this patent is extended or adjusted under 35 U.S.C. 154(b) by 63 days.

(21) Appl. No.: 13/539,163

(22) Filed: Jun. 29, 2012

(65) Prior Publication Data

US 2014/0007090 A1    Jan. 2, 2014

(51) Int. Cl.
G06F 9/455    (2006.01)
G06F 11/34    (2006.01)

(52) U.S. Cl.
CPC ............ *G06F 9/455* (2013.01); *G06F 11/3495* (2013.01); *G06F 9/45533* (2013.01); *G06F 2201/815* (2013.01); *G06F 2201/865* (2013.01)

(58) Field of Classification Search
CPC .................................................... G06F 9/455
USPC .......................................................... 718/1
See application file for complete search history.

(56) References Cited

U.S. PATENT DOCUMENTS

| | | |
|---|---|---|
| 5,590,332 A | 12/1996 | Baker |
| 5,872,910 A | 2/1999 | Kuslak et al. |
| 7,735,067 B1 * | 6/2010 | Leventhal ...................... 717/128 |
| 2006/0206680 A1 | 9/2006 | Yamanaka et al. |
| 2007/0180439 A1 * | 8/2007 | Sundararajan et al. ....... 717/158 |
| 2008/0243969 A1 * | 10/2008 | Wintergerst et al. .......... 707/206 |
| 2008/0295095 A1 * | 11/2008 | Watanabe et al. ................. 718/1 |
| 2010/0287541 A1 * | 11/2010 | Saunders et al. .............. 717/139 |
| 2011/0154297 A1 | 6/2011 | Singh et al. |
| 2011/0179162 A1 * | 7/2011 | Mayo et al. .................... 709/224 |
| 2011/0296110 A1 * | 12/2011 | Lilly et al. ..................... 711/118 |
| 2012/0084778 A1 * | 4/2012 | Mall et al. ......................... 718/1 |
| 2012/0159454 A1 * | 6/2012 | Barham et al. ................. 717/128 |
| 2013/0326110 A1 * | 12/2013 | Tsirkin et al. ...................... 711/6 |

OTHER PUBLICATIONS

Clifford E. Cummings, Simulation and Synthesis Techniques for Asynchronous FIFO Design, SNUG San Jose 2002.*
Addbot, Tail call Feb. 27, 2013, Wikipedia, p. 12.
Addbot, Trampoline, Mar. 12, 2013, Wikipedia, p. 3.

* cited by examiner

*Primary Examiner* — Emerson Puente
*Assistant Examiner* — Charlie Sun

(57) ABSTRACT

Probes are instrumented in multiple software modules of a computer system having virtual machines running therein and executed in a coordinated manner. An output of one probe may be used to conditionally trigger another probe so that the precision of collected data may be improved. In addition, outputs of probes that are triggered in different software modules by related events may be synchronized and analyzed collectively. Probes also may be parallel processed in different processors so that multiple probes can be processed concurrently.

14 Claims, 7 Drawing Sheets

SIMULTANEOUS PROBING OF MULTIPLE SOFTWARE MODULES OF A COMPUTER SYSTEM

BACKGROUND

Various tools have been developed for monitoring performance of a virtualized computer system. One such tool, known as VProbes, which is developed by VMware, Inc. of Palo Alto, Calif., enables administrators to "dynamically" instrument various software modules of virtual machines (VMs) running in a virtualized computer system and gather performance data relating to the instrumented software modules for analysis. The tool provides for dynamic instrumentation because the code for probing the software modules can be injected while the VMs are running. As a result, answers to questions such as, "Why is an application running slowly in the virtual machine?" or "Which virtual machines are consuming the majority of the I/O bandwidth?" may be explored without recompilation or downtime. Further details of VProbes are described in the user's manual available from VMware, Inc. entitled "VMware VProbes User Guide," which is incorporated by reference herein.

A probe script is employed in VProbes as a mechanism to dynamically inject the code for probing the software modules of VMs. The probe script defines one or more probes, where each probe has a trigger and a body of code. The trigger specifies an event of interest in the instrumented software module, such as a read, a write, or a periodic timer tick, and the body of code is executed when the event of interest occurs, i.e., when the probe is triggered. When such a probe script is loaded into a virtualized computer system with running VMs, it is compiled into executable code that is dynamically injected into various executing portions of the virtualized computer system. For security purposes, the probe script is checked during compilation for infinite loops, bad pointers, and generally any portions that could cause the system to hang or crash. When the script is unloaded, the injected code is removed and the virtualized computer system returns to its original state.

VProbes, as described above, is safe, because it ensures through the script compiler that the state of the running virtualized computer system can never change. VProbes is also dynamic, because probes can be injected into a running virtualized computer system without recompilation and downtime of the virtualized computer system. Finally, VProbes has little or no impact on overhead, because it can be unloaded and not add to the overhead of the virtualized computer system when not in use.

SUMMARY

One or more embodiments disclosed herein provide a probing tool for virtualized computer systems that extends the benefits of VProbes. According to the embodiments, probes are instrumented in multiple software modules of a computer system having virtual machines running therein and are executed in a coordinated manner. In one embodiment, an output of one probe may be used to conditionally trigger another probe. This may be done to improve the precision of data collected by the probe. For example, a probe that collects I/O statistics of a virtual machine running a database application may be triggered only when the database application is processing a transaction. In another embodiment, outputs of probes that are triggered in different software modules by related events (e.g., events occurring in different software modules of the computer system when a network packet is processed for transmission) are synchronized and analyzed collectively.

A method of probing multiple domains of a computer system having virtual machines running therein, such as different software modules that support the execution of the virtual machines, according to one embodiment, includes the steps of instrumenting a first domain with a first probe and a second domain with a second probe, and executing the first probe in the first domain and the second probe in the second domain, wherein a value of a variable that is shared by the first and second probes is updated as a result of execution of the first probe, and the updated value of the shared variable is read during execution of the second probe and used to direct the execution of the second probe.

A method of probing multiple domains of a computer system having virtual machines running therein, such as different software modules that support the execution of the virtual machines, according to another embodiment, includes the steps of injecting a first code to be executed within a context of a first software module, injecting a second code to be executed within a context of a second software module that is different from the first software module, and storing first and second outputs generated by the first and second codes, respectively, in a common buffer according to a time order.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1A:
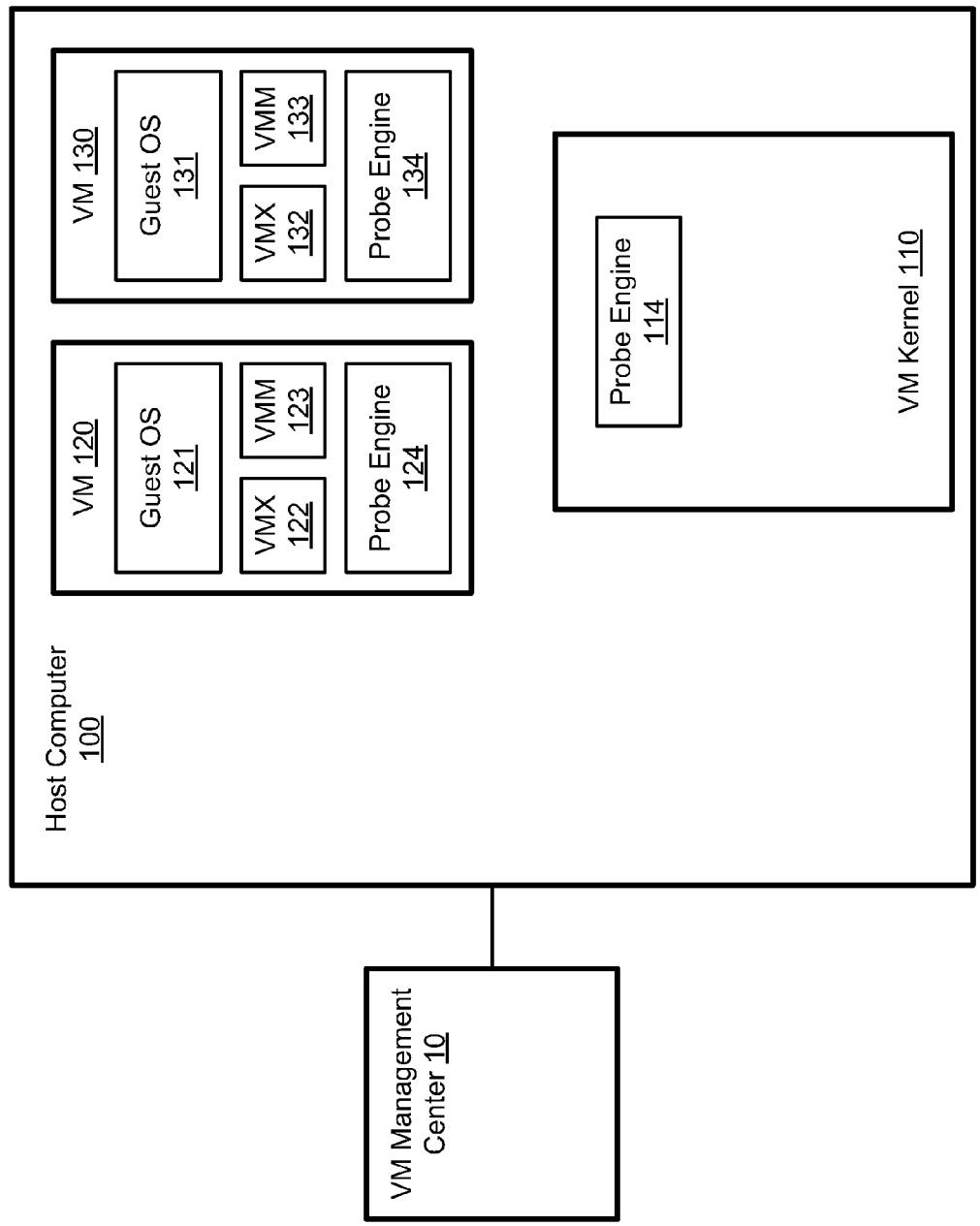
FIG. 1A is a block diagram of a computer system in which probing according to one or more embodiments may be implemented.

FIG. 1A is a block diagram of a computer system in which probing according to one or more embodiments may be implemented. The computer system, as illustrated, includes a virtual machine management center 10 for managing virtual resources, such as virtual machines (VMs) and a host computer 100 in which VMs 120, 130 are running For purposes of illustration, two VMs are shown in FIG. 1A but it should be recognized that embodiments may be practiced with just a single VM or with more than two VMs.

VM 120 includes a guest operating system (OS) 121 that provides system software support for applications running inside VM 120, and several processes, including VMX 122 and a virtual machine monitor (VMM) 123, that run inside VM kernel (VMK) 110, which represents the kernel of system software of host computer 100. VMX 122 is a process that is responsible for handling input/output (I/O) to devices that are not critical to performance, and for communicating with user interfaces and virtual machine management center 10. It should be understood that a VMX process associated with a VM is different from a .vmx file for that VM, which stores configuration settings for that VM including configurations settings associated with VProbes, as described in the VMware VProbes User Guide. VMM 123 is responsible for virtualizing the guest OS instructions, and manages memory for the VM 120. VMM 123 also passes storage and network I/O requests to VMK 110, and all other requests to VMX 122. Similarly, VM 130 includes a guest OS 131, VMX 132, and VMM 133.

Probing in the computer system of FIG. 1A is implemented via a probe engine configured in each of VMs and VMK 110. As shown, probe engines 124, 134 are configured for VMs 120, 130, respectively, and probe engine 114 is configured for VMK 110. Each of the probe engines operates independently, except that some variables are shared among the probe engines in a manner that will be described below. Within each VM, probing may be separately enabled for (1) the guest, which includes the guest OS and the applications running on top of the guest OS, (2) the VMX, and (3) the VMM. The different targets of probing, which includes the guest, the VMX, the VMM, and the VM kernel will be referred to hereinafter as the, the GUEST domain, the VMX domain, the VMM domain, and the VMK domain, respectively. It should be recognized that all vCPU threads are part of the VMM domain, and pCPU (physical central processing unit) threads are part of the VMK domain. As described herein, each of the probed domains, the guest, the VMX, the VMM, and the VM kernel, is a software module that runs as separate processes in the computer system.

Figure 1B:
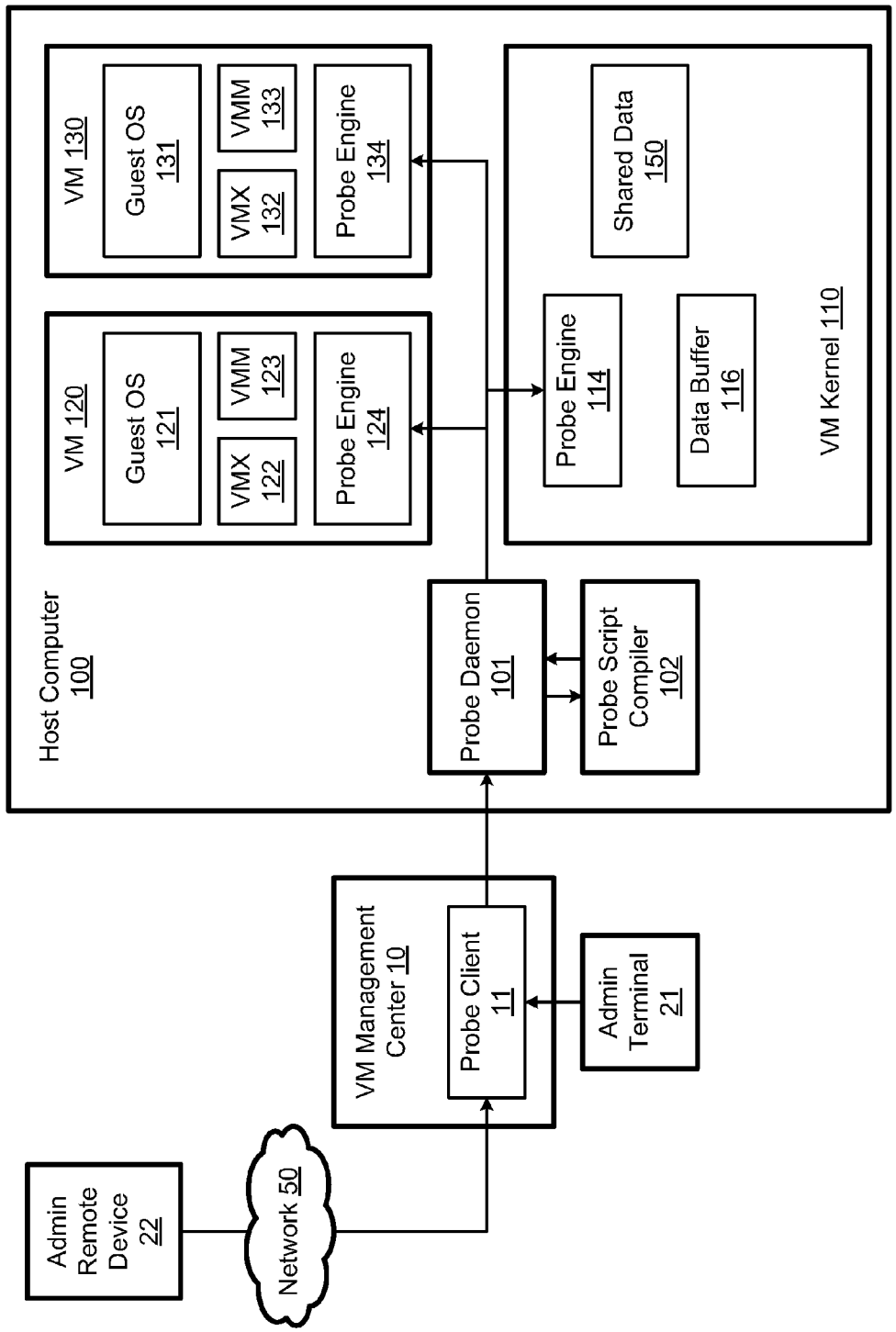
FIG. 1B illustrates a process of deploying probes in the computer system of FIG. 1A.

FIG. 1B illustrates a process of deploying probes in the computer system of FIG. 1A. In the embodiment illustrated herein, probes are deployed when a user loads a probe script into the computer system through a probe client 11 running in VM management center 10. The user may load the probe script using an administrator terminal 21 that interfaces with probe client 11 or remotely via network 50 from an administrator's remote device 22, which may be any type of computing device, such as a smartphone, a tablet computing device, laptop computer, and a desktop computer.

Once a probe script is loaded via probe client 11, the probe script is transmitted to and received by a probe daemon 101 running in host computer 100. Probe daemon 101 is responsible for coordinating the initial compilation of the probe script and extracting components for final compilation by each of probe engines 114, 124, 134. In one embodiment, probe script compiler 102 performs the initial compilation to generate a byte code for each of the different probes defined in the probe script. During this initial compilation, the probe script is checked for infinite loops, bad pointers, and generally any portions that could cause the system to hang or crash. The Emmett compiler described in the "VMware VProbes User Guide" may be used as probe script compiler 102.

Figure 1C:
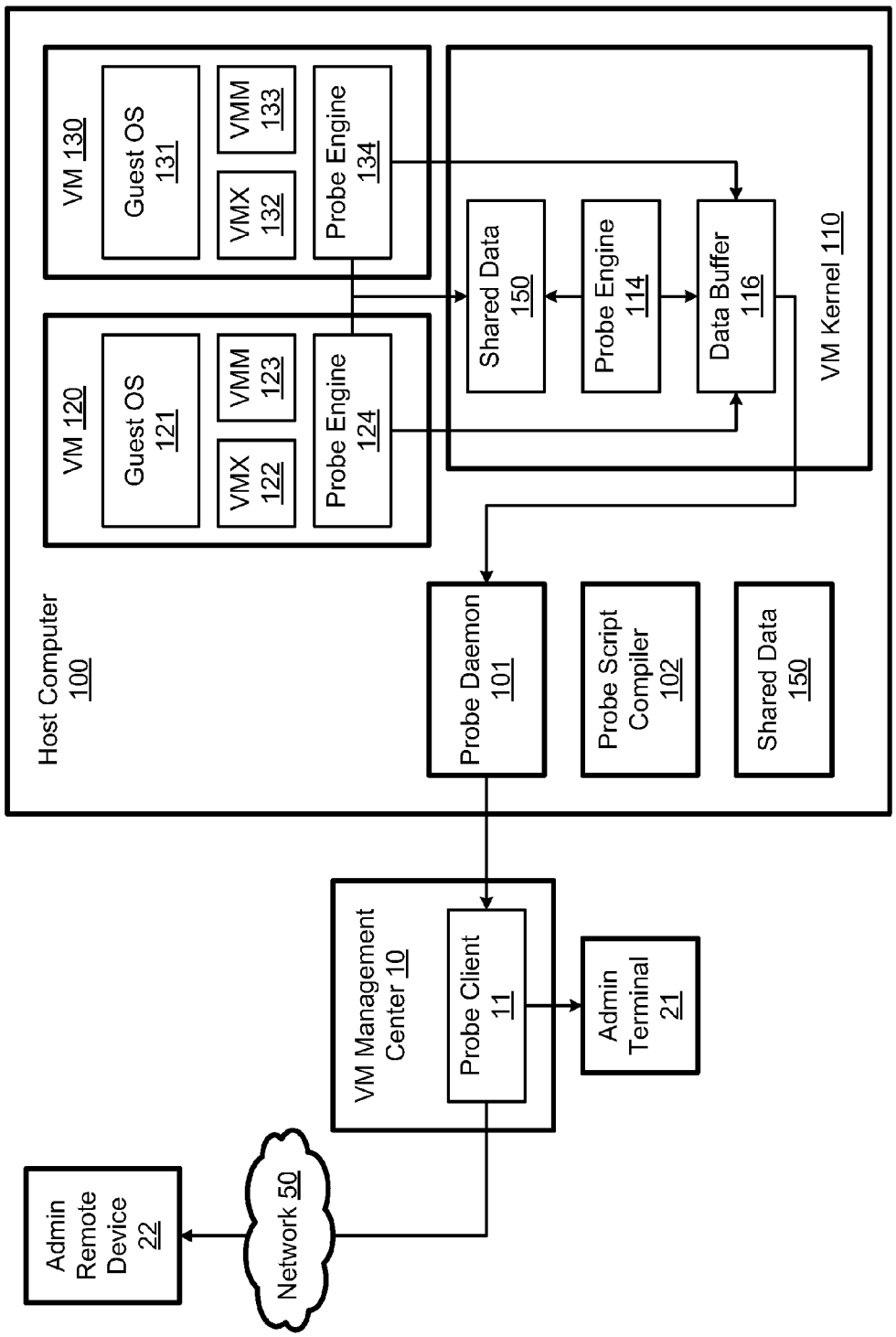
FIG. 1C illustrates a process of collecting data using probes that have been instrumented in different components of the computer system of FIG. 1A.

Each of probe engines 114, 124, 134 is responsible for compiling the byte code for one or more probes received from probe daemon 101 into binary code and injecting the binary code for the probes into the targeted domain. When a probe executes in a particular domain, it has access to information specific to that domain. For example, a probe that executes in the VMM domain has access to VMM specific information, such as the register contents of the vCPUs and a probe that executes in the VMK domain has access to register contents of the pCPUs and other VM kernel data structures. As part of the binary code compilation process, each of probe engines 114, 124, 134 provisions a queue in system memory for each vCPU or pCPU thread being probed. When a probe executes within a particular vCPU or pCPU thread, the output generated by the probe is collected into the queue provisioned for this thread. Probe engine 114 for the VMK domain also provisions a data buffer 116, into which the outputs stored in each of the queues are periodically collected. As shown in FIG. 1C, probe output data that are collected into data buffer 116 are streamed back to probe client 11 by probe daemon 101.

The probe script includes one or more probes, where each probe defines a domain that it is targeting, a trigger, and a body of code. The targeted domain may be any of GUEST, VMX, VMM, and VMK. In situations where there are multiple instances of the same domain, e.g., where there are two VMs, the targeted domains will be GUEST1, GUEST2, VMX1, VMX2, VMM1, VMM2, and VMK. The trigger specifies an event of interest in the targeted domain, such as a read, a write, code execution, or a periodic timer tick, and the body of code is executed when the event of interest occurs. Various data types may be defined for the output generated by the probes, such as strings, aggregates, and bags, all of which are further described in the "VMware VProbes User Guide."

According to one or more embodiments, any probe may rely on shared variables, which are variables that are shared across different probe domains. These shared variables are represented in FIG. 1B as shared data 150. As a result of the shared variables, a communication channel can be established between the different probe domains and execution of a probe in one domain may be made conditional on a probe output of another domain. For example, when analyzing disk latency of a database transaction carried out by the guest, a probe may be instrumented in the VMK domain to collect disk latency information. As a way to collect disk latency information only when a database transaction is occurring, a shared flag, which is set by a probe that is executing in the GUEST domain and triggered by a database transaction carried out by the guest, is used and the probe running in the VMK domain collects disk latency information only when this shared flag is set, i.e., when a database transaction is being carried out. As another example, when analyzing network packet transmission latency, a probe may be instrumented in each of the GUEST, VMM, and VMK domains, and as a network packet travels through the different domains, the execution of the probes in the different domains may be made conditional upon a shared flag that is set to indicate that the network packet of interest is in flight.

In some embodiments, shared data 150 may be classified as "per thread," "per VM," "per VMK," or "per host." A "per thread" shared variable is shared by probes executing in the same vCPU or pCPU thread. A "per VM" shared variable is shared by probes executing in the same VM domain, i.e., the GUEST, VMM, and VMX domains of a single VM. A "per VMK" shared variable is shared by probes executing in the same VMK domain. A "per host" shared variable is shared across all domains.

Figure 2:
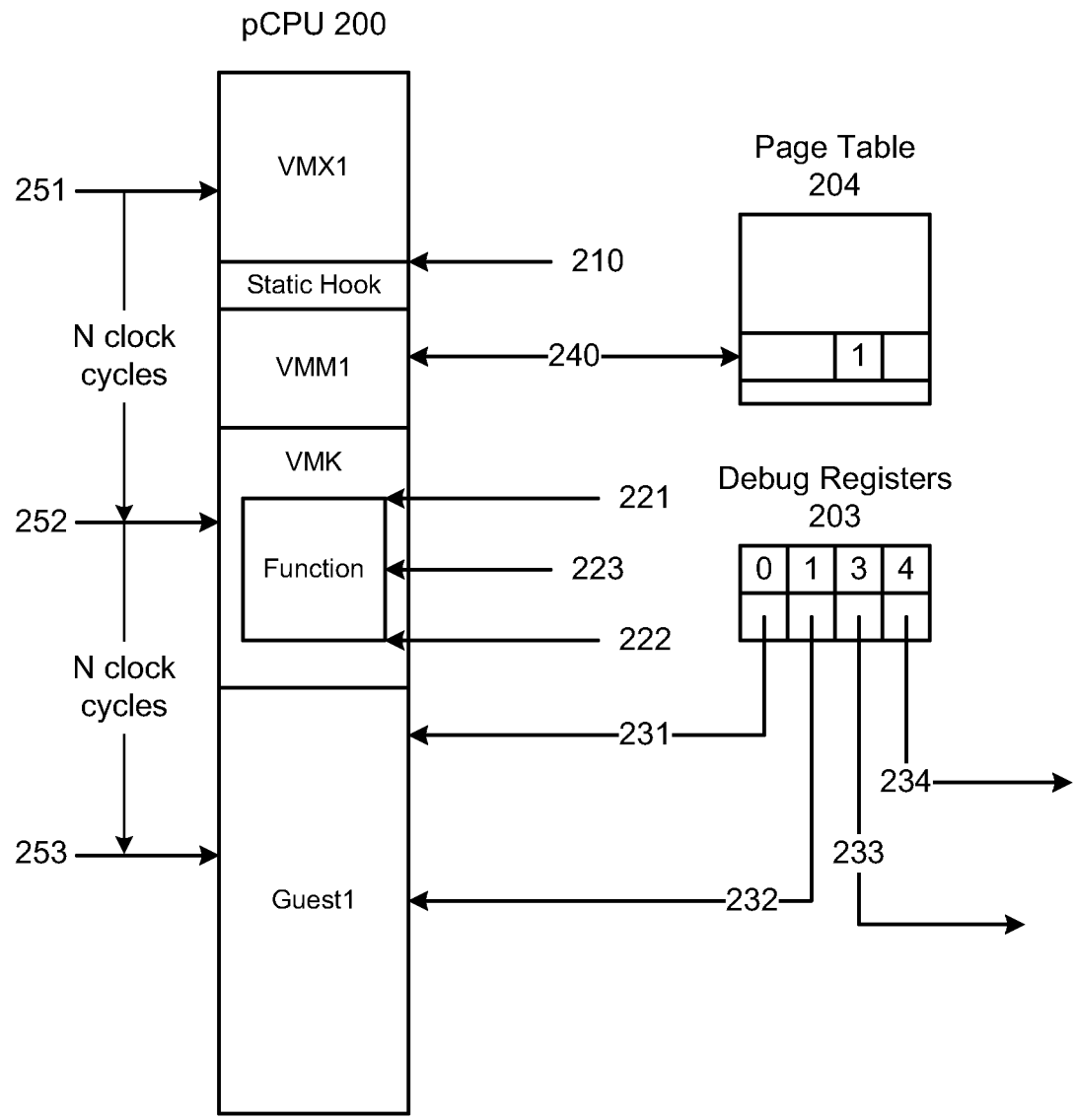
FIG. 2 is a conceptual diagram that illustrates different types of probes that can be injected into a sequence of instructions executed in a processor.

FIG. 2 is a conceptual diagram that illustrates different types of probes that can be injected into a sequence of instructions executed in a processor. In general, there are three classes of probes—static probes, dynamic probes, and periodic probes. Static probes are probes that trigger at predefined points of interest in the targeted domain, e.g., the point of transmission of a network packet or the point of delivery of an interrupt. Dynamic probes are probes that trigger at breakpoints on arbitrary instructions or watchpoints on an arbitrary piece of data. Periodic probes are probes that trigger periodically.

In the example shown in FIG. 2, pCPU 200 is executing a sequence of instructions, including code for the VMX domain, the VMM domain, the VMK domain, and the Guest domain. Between the code for the VMX domain and the VMM domain, a static hook is defined at point 210. A probe may be injected into this position (which is statically defined) and executed when the trigger condition for that probe is satisfied.

A probe may also be injected at various points in the sequence of instructions that may be dynamically defined by causing an exception and executing the probe as part of the exception handling routine. FIG. 2 illustrates three such examples. In the first example, int3 instruction may be inserted at the beginning of a function (point 221), at the end of a function (point 222), or at a certain byte offset from the beginning of a function (point 223). When the int3 instruction is reached, an exception is raised and a probe is executed in response thereto. In the second example, instruction addresses at various points in the sequence of instructions, e.g., 231, 232, 233, and 234, where probes are to be injected, are stored in debug registers 203, namely DR0, DR1, DR2, and DR3 registers. When any of these instruction addresses are reached, an exception is raised and a probe is executed in response thereto. In the third example, attributes of an entry of a page table 204 in system memory may be changed to cause an exception (e.g., a page fault) when an instruction (e.g., at point 240) accesses that page table entry. In this example, the exception handling for the page fault would be modified to cause execution of the probe. It should be recognized that data watchpoint probes may be implemented by altering the attributes of an entry of page table 204 corresponding to the memory location of the data being monitored. Finally, periodic probes are shown as probes 251, 252, 253 which are trigger periodically, e.g., every N clock cycles.

Figure 3:
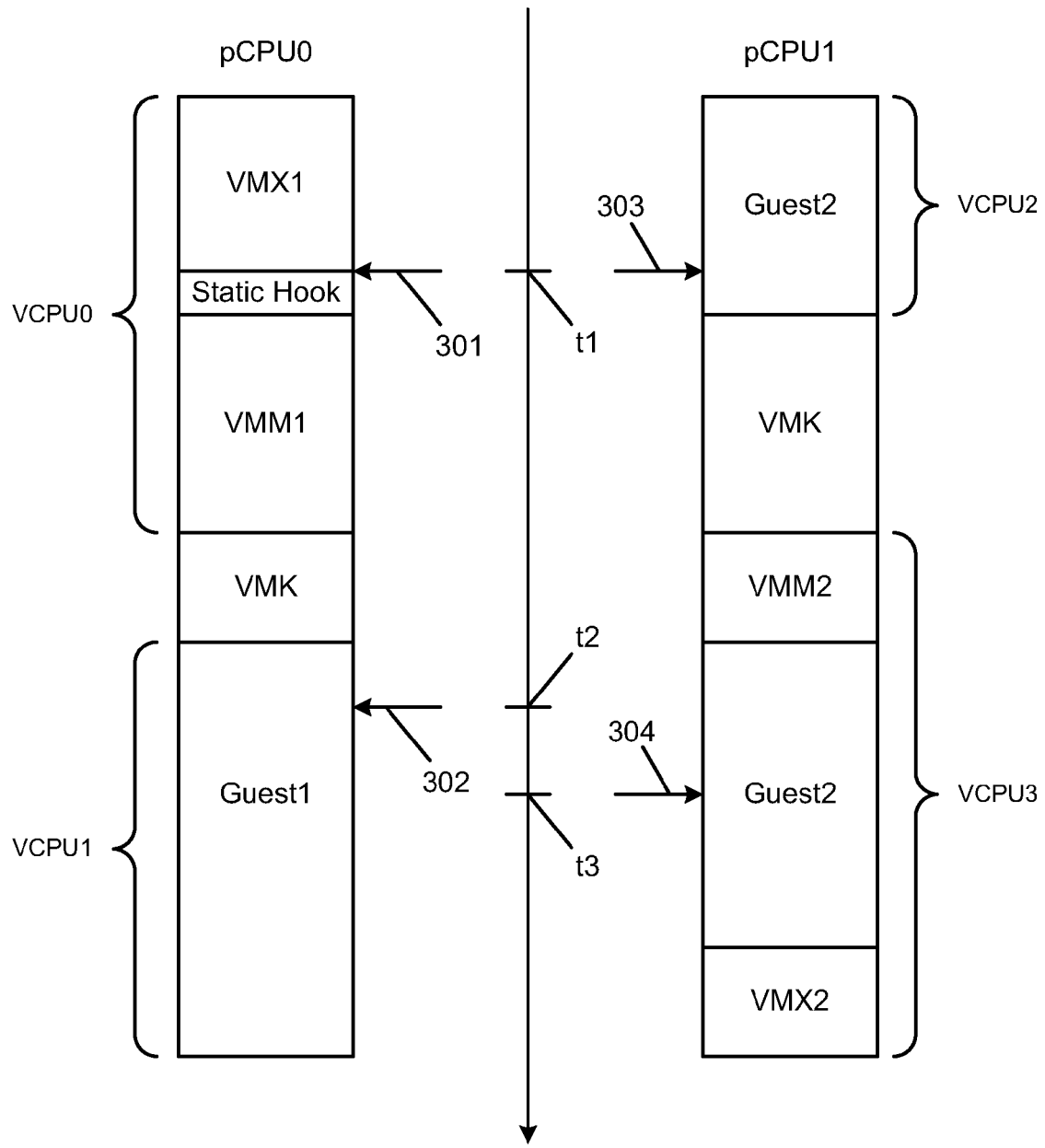
FIG. 3 is a timing diagram that shows probing being executed in different software modules of the computer system.

FIG. 3 is a timing diagram that shows probing being executed in different software modules of the computer system. The example shown in FIG. 3 shows two pCPU threads and two vCPU threads per pCPU thread. The two vCPU threads running in pCPU0 are the vCPU0 thread and the vCPU1 thread. The two vCPU threads running in pCPU1 are the vCPU2 thread and the vCPU3 thread. FIG. 3 also illustrate four probes 301, 302, 303, 304 that are triggered at various points along the illustrated time scale. Probe 301 and probe 303 are triggered simultaneously at t1 and executed concurrently. Probe 302 is triggered at t2 and probe 304 is triggered at t3. Outputs generated by probes 301, 302, 303, 304 during execution thereof will be collected in a respective queue provisioned per vCPU thread (a separate queue for each of vCPU0, vCPU1, vCPU2, and vCPU3) and per pCPU thread (a separate queue for each of pCPU0 and pCPU1).

Figure 4:
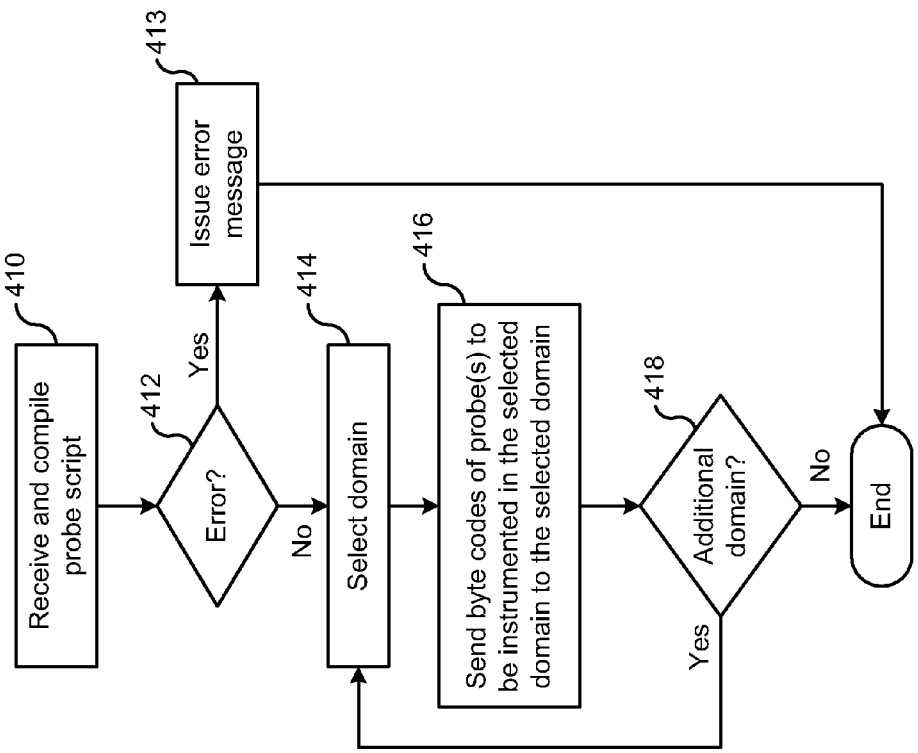
FIG. 4 is a flow diagram that illustrates a method for deploying probes in different software modules of the computer system.

FIG. 4 is a flow diagram that illustrates a method for deploying probes in different software modules of the computer system. In the embodiment illustrated herein, this method is being carried out by probe daemon 101 in conjunction with probe script compiler 102. The method begins at step 410 when a probe script loaded into probe client 11 and received by probe daemon 101. In response, probe daemon 101 invokes probe script compiler 102 to compile the probe script into byte codes and check the probe script for infinite loops, bad pointers, and generally any portions that could cause the system to hang or crash. If it is determined at step 412 that the probe script has errors, an appropriate error message is issued to probe client 11. If there are no errors, probe daemon 101 segments the byte codes for distribution. At step 414, probe daemon 101 selects a domain as a distribution target. Then, at step 416, probe daemon 101 sends the byte code of the probe or probes to be instrumented in the selected domain to a probe engine of the selected domain (step 416). Upon receipt of the byte code, the probe engine compiles the byte code of the probes into binary code and implements the probe as described above in conjunction with FIG. 2. If there are more domains to process, as determined at step 418, the method returns to step 414. If not, the method terminates.

Figure 5:
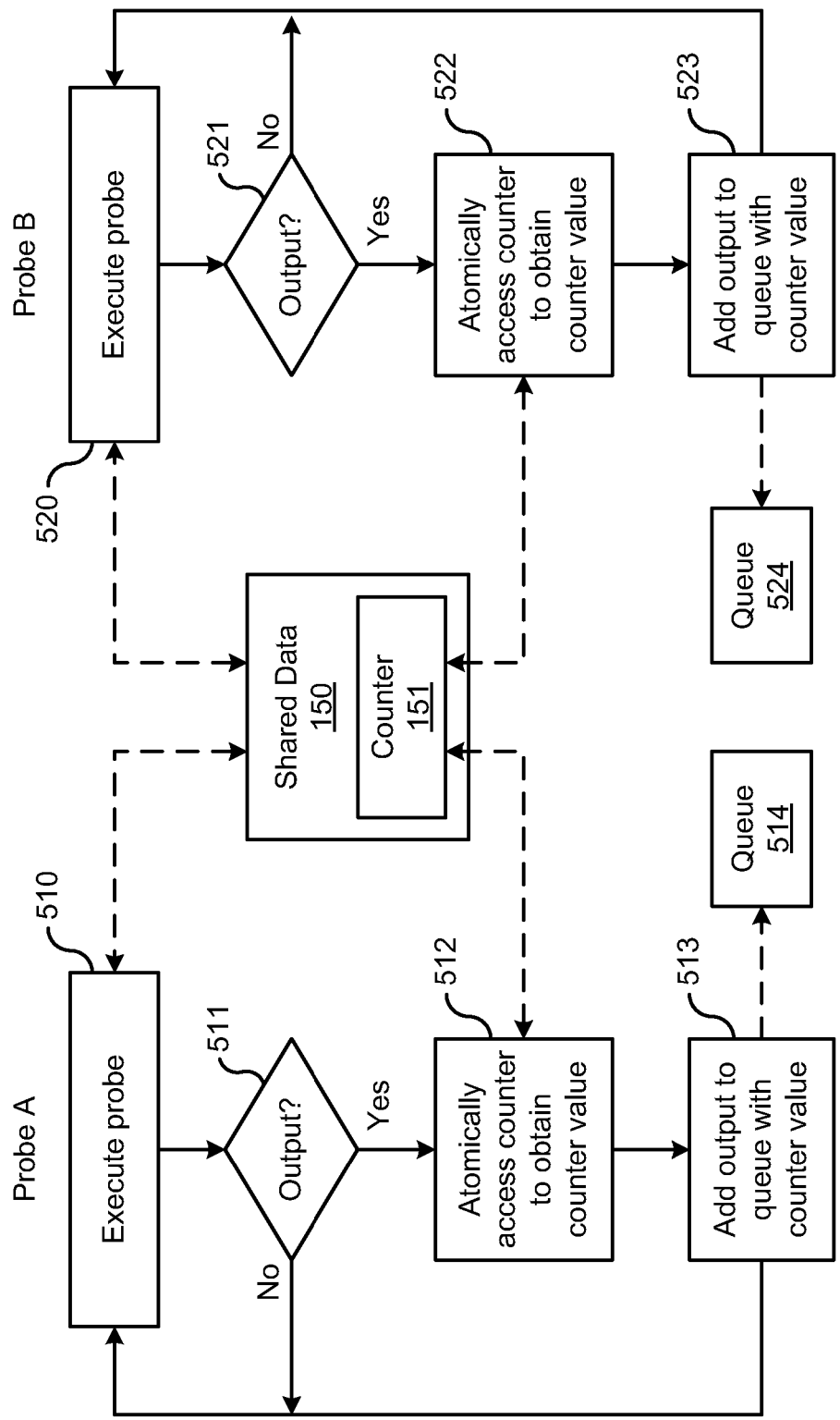
FIG. 5 is a flow diagram that illustrates a method of probing and collecting probe outputs according to an embodiment.

FIG. 5 is a flow diagram that illustrates a method of probing and collecting probe outputs according to an embodiment. In the embodiment illustrated herein, two probes, probe A and probe B, are executing and it is assumed they are being executed in different domains and on different pCPUs. For example, probes A and B may correspond to probes 301 and 303 or to probes 302 and 304. As probes A and B are executed (steps 510 and 520), they may update values of shared variables in shared data 150 or access values of shared variables in shared data 150. As described above, shared data 150 provides a communication channel between domains in which the probes are being executed so that the execution of one probe may be made dependent on the output generated by another probe. If, during execution of probe A, it is determined at step 511 that probe A has generated an output, step 512 is executed, where probe A atomically accesses a counter 151 that is being maintained as part of shared data 150. Upon access, the counter value of counter 151 is incremented. Then, at step 513, probe A adds its output together with the incremented counter value to a queue 514, which will be a vCPU thread queue if probe A is being executed in the VMX, VMM, or GUEST domains or a pCPU thread queue if probe A is being executed in the VMK domain. In a similar manner, if, during execution of probe B, it is determined at step 521 that probe B has generated an output, step 522 is executed, where probe B atomically accesses counter 151, which upon access, the counter value thereof is incremented. Then, at step 523, probe B adds its output together with the counter value to a queue 524, which will be a vCPU thread queue if probe B is being executed in the VMX, VMM, or GUEST domains or a pCPU thread queue if probe B is being executed in the VMK domain. It should be recognized that, because counter 151 is atomically incremented, the queues will contain unique counter values, and the counter values will provide an indication of the relative time order of the outputs that are stored in the queues.

Figure 6:
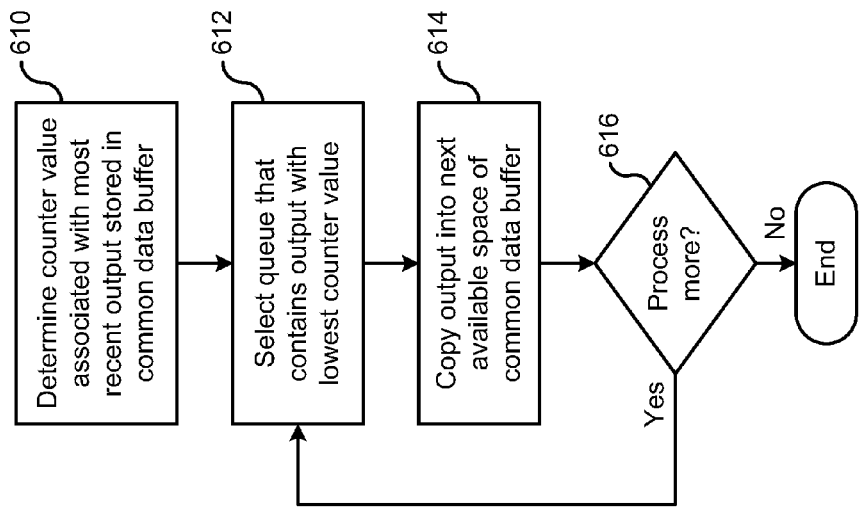
FIG. 6 is a flow diagram that illustrates a method of collecting data generated by different probes in a common data buffer.

FIG. 6 is a flow diagram that illustrates a method of collecting data generated by different probes in a common data buffer. In the embodiment illustrated herein, a probe output module may be executed within VMK 110 to perform this method. The probe output module executes this method according to a configurable schedule, e.g., once per second, so that probe outputs can be provided to probe client 11 with reasonable frequency. The method begins at step 610, with the probe output module determining the counter value associated with the most recent output that was stored in data buffer 116. If there were none, a counter value of 0 is used. Then, at step 612, a queue that contains the output with the next counter value is selected. At step 614, the output with the next counter value is copied into the next available space in data buffer 116. If the probe output module determines at step 616 that the queues still contain a probe output that needs to be collected into data buffer 116, the method returns to step 612. Otherwise, the method terminates. It should be recognized that at any time, e.g., during or after collection of the outputs into data buffer 116, probe daemon 101 can stream the contents of data buffer 116 back to probe client 11.

In the embodiments disclosed herein, a user loads a single script into the computer system to probe the various software modules of the computer system and collect the probe outputs into a single buffer, the contents of which are streamed back to the user for analysis. In further embodiments, multiple scripts may be loaded into the computer system by the same user or by different users and the outputs of the probes may be tagged sufficiently to allow them to be distinguished and collected in different data buffers and streamed to the user or users separately for analysis.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of probing first and second domains of a computer system having virtual machines running therein, comprising:
   instrumenting the first domain with a first probe and the second domain with a second probe;
   executing the first probe in the first domain, wherein a value of a variable that is shared by the first and second probes is updated based on an output of the first probe probing the first domain; and
   executing the second probe in the second domain, the updated value of the shared variable being read during execution of the second probe and used to direct the execution of the second probe,
   wherein outputs generated by the first probe and outputs generated by the second probe are collected in a common buffer according to a time order, wherein outputs generated by the first probe are stored in a first queue prior to being stored in the common buffer and outputs generated by the second probe are stored in a second queue prior to being stored in the common buffer, and wherein the first and second probes access a shared counter when each of the outputs generated by the first probe and the outputs generated by the second probe is stored in the first queue and in the second queue, respectively, and each of the outputs stored in the first and the second queues is associated with its own unique value obtained from the shared counter.

2. The method of claim 1, wherein the first probe and the second probe are concurrently executed.

3. The method of claim 2, wherein the computer system includes multiple physical processors, and the first probe and the second probe are concurrently executed in different physical processors.

4. The method of claim 1, wherein the computer system includes multiple physical processors and multiple virtual processors, each of the virtual processors being mapped to one of the physical processors, and the first probe and the second probe are executed in different virtual processors.

5. The method of claim 1, wherein the first and second domains of the computer system are different software modules of the computer system.

6. The method of claim 5, wherein the first domain includes a kernel of a system software of the computer system, and the second domain includes a guest operating system of a virtual machine running in the computer system.

7. The method of claim 1, wherein said instrumenting includes:
receiving a script that defines the first probe and the second probe;
compiling the script to generate a first part including an executable code for the first probe and second part including an executable code for the second probe; and
while the first and second domains of the virtualized computer system are running, injecting the first and second parts into the first and second domains, respectively.

8. The method of claim 1, wherein the outputs of the first and second probes are stored in the common buffer according to the magnitude of their respective associated unique values.

9. The method of claim 8, wherein the shared counter is incremented upon each access to associate different unique values to different outputs in the outputs of the first and second probes.

10. A method of probing multiple software modules of a virtualized computer system that include first and second software modules, comprising:
receiving a script that defines a first probe and a second probe;
compiling the script to generate a first part including an executable code for the first probe and a second part including an executable code for the second probe;
while the first and second software modules of the virtualized computer system are running, injecting the first and second parts into the first and second software modules, respectively, wherein a value of a variable that is shared by the first and second probes is updated based on an output of the first probe probing the first software module, and wherein the updated value of the shared variable is read during execution of the second probe and used to direct the execution of the second probe; and
storing a first output generated by the first part and a second output generated by the second part in a common buffer according to a time order, wherein outputs generated by the first part are stored in a first queue prior to being stored in the common buffer and outputs generated by the second part are stored in a second queue prior to being stored in the common buffer, and wherein the first and second parts access a shared counter when each of the outputs generated by the first part and the outputs generated by the second part is stored in the first queue and in the second queue, respectively, and each of the outputs stored in the first and the second queues is associated with its own unique value obtained from the shared counter.

11. The method of claim 10, wherein the shared counter increments upon each access and each of the outputs is ordered in the common buffer according to the magnitude of the associated respective unique value.

12. The method of claim 10, wherein the first software module includes a kernel of a system software of the computer system, and the second software module includes a guest operating system of a virtual machine running in the computer system.

13. A non-transitory computer readable storage medium comprising instructions that define first and second probes for first and second software modules of a computer system having virtual machines running therein, respectively, wherein the instructions, when executed in the computer system, cause the computer system to perform a method of probing that includes the steps of:
executing the first probe within a context of the first software module, wherein a value of a variable that is shared by the first and second probes is updated based on an output of the first probe probing the first software module; and
executing the second probe within a context of the second software module, the updated value of the shared variable being read during execution of the second probe and used to direct the execution of the second probe,
wherein outputs generated by the first probe and outputs generated by the second probe are collected in a common buffer according to a time order, wherein outputs generated by the first probe are stored in a first queue prior to being stored in the common buffer and outputs generated by the second probe are stored in a second queue prior to being stored in the common buffer, and wherein the first and second probes access a shared counter when each of the outputs generated by the first probe and the outputs generated by the second probe is stored in the first queue and in the second queue, respectively, and each of the outputs stored in the first and the second queues is associated with its own unique value obtained from the shared counter.

14. The non-transitory computer readable storage medium of claim 13, wherein the computer system includes multiple physical processors, and the first probe and the second probe are concurrently executed in different physical processors.

* * * * *